C. E. McNEMAR.
TIRE REPAIR TOOL.
APPLICATION FILED AUG. 8, 1921.
1,410,819.
Patented Mar. 28, 1922.
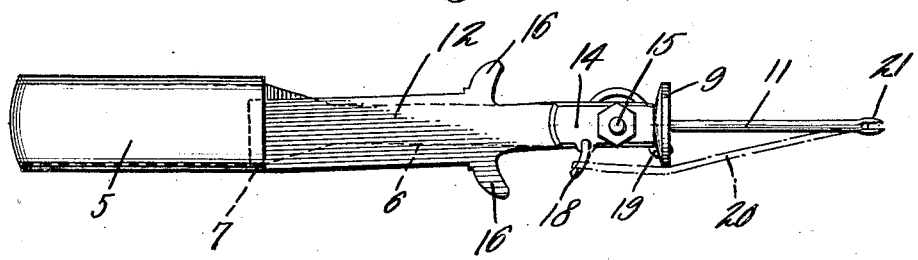
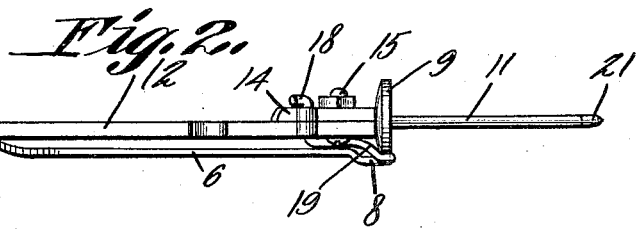
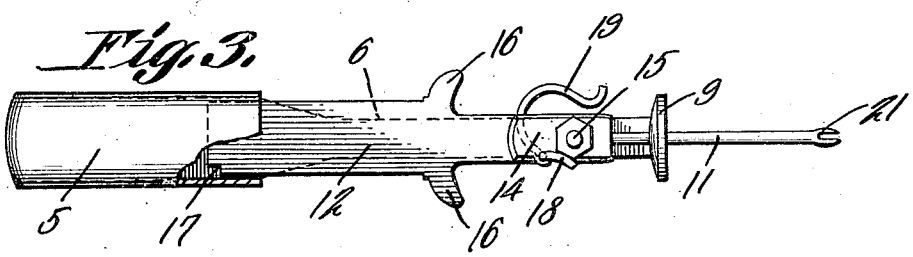
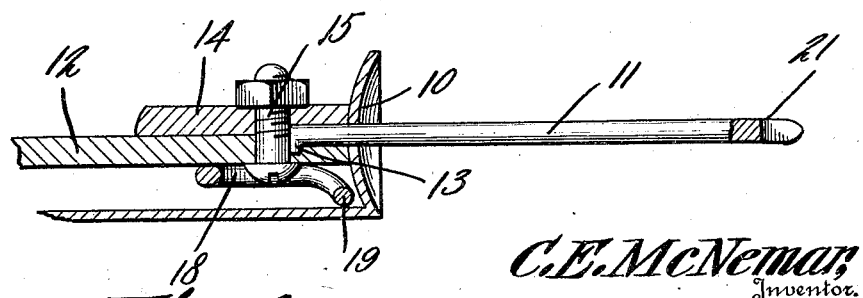
C. E. McNemar,
Inventor.
By C. A. Snow & Co.
Attorney

UNITED STATES PATENT OFFICE.

CORRY E. McNEMAR, OF MANHATTAN, KANSAS.

TIRE-REPAIR TOOL.

1,410,819.  Specification of Letters Patent.  Patented Mar. 28, 1922.

Application filed August 8, 1921. Serial No. 490,607.

*To all whom it may concern:*

Be it known that I, CORRY E. MCNEMAR, a citizen of the United States, residing at Manhattan, in the county of Riley and State of Kansas, have invented a new and useful Tire-Repair Tool, of which the following is a specification.

This invention relates to tire repairing tools, and more particularly to a tool designed to plug an opening in a tire casing to prevent foreign matter from entering the interior of the casing and to eliminate the possibility of air exhausting therefrom.

The primary object of the invention is to provide means to prevent the member used in plugging the opening from being withdrawn from the opening when the tool is removed.

Another object of the invention is to provide means to operate the tool with facility to insure the plugging of the opening.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a tool constructed in accordance with the present invention.

Figure 2 is a plan view of the same.

Figure 3 is a side elevational view, the handle portion of the tool being broken away to show the guard supporting arm as movable within the handle portion; and Figure 4 is an enlarged sectional view of the guard and support.

Referring to the drawing in detail, the device includes a handle portion 5 and an elongated offset body portion 6, the handle portion being hollow to accommodate a portion of the movable arm 12.

The outer end of the body portion 6 is offset as at 8, and is provided with a circular head 9 which has a concaved outer surface 10, adapted to engage the tire adjacent to the punctured portion thereof, to guard the same and prevent the material employed in plugging the puncture from being withdrawn from the tire when the puncture is plugged.

This head 9 is provided with a central opening to accommodate the needle 11 that is carried by the movable arm 12, one end of the needle being shown as formed at right angles as indicated at 13, which right angled portion is positioned in a suitable opening formed in the member 12, there being provided a clamping member 14 contacting with one surface of the needle for holding the right angled portion within its opening. A bolt 15 passes through suitable openings in the members 12 and 14 to hold the members 12 and 14 in close engagement with each other, thereby preventing movement of the needle when the same is in operation.

Lateral extensions 16 are formed on the member 12 at a point substantially intermediate the ends thereof, which extensions form finger grips to be engaged by the fingers of the operator to move the member 12 within the handle portion 5. At one end of the member 12 is formed a notch 17, which notch is designed to engage one end of the handle portion 5 to lock the member 12 in its extended position.

Carried by the member 12 is a movable hook member 18, one end of the hook member being formed into a trigger 19 to be engaged by the thumb of the operator, to move the needle and band 20 to a position as shown by Figure 1 of the drawing. It might be further stated that the needle 11 is of a particular design, the same being provided with a bifurcated extremity 21, in which a rubber band or the like may be positioned.

In the use of the device, a rubber band or bands may be placed on the tool in a position as indicated by Figure 1 of the drawing, whereupon the tool is placed in the hand of the user, the handle 5 thereof engaging the palm of the hand. The rubber bands are now covered with a suitable adhesive material such as cement used for securing rubber patches and the needle, together with the rubber band, is inserted in the opening or puncture in the tire.

With the tool in this position, the first and second fingers are gripped around the lateral extensions 16. A slight movement of the thumb against the member 12 disengages the notch 17 from the handle 5, the first and second fingers being used for withdrawing the needle from the tire by moving the member 12 within the handle portion 5.

It is obvious that the first movement of the member 12 releases the trigger from engagement with the head portion 9 when the trigger 19 and hook 18 are automatically moved to the position as shown by Figure 3, this action taking place, due to the contraction of the bands 20. When the tool is released, the bands contract to the surface of the tire and are positioned between the tire and guard 9, at the same time the rubber bands expand, filling the puncture.

It might be further stated that during the removal of the needle from the opening, the guard 9 contacts with the rubber which is positioned within the opening to prevent the same being withdrawn with the needle.

Having thus described the invention, what is claimed as new is:—

1. In a device of the character described, a hollow handle portion, an elongated body formed integral with the handle portion and having a right angled end providing a guard, a movable member supported by the body portion and adapted to move within the handle portion, and a needle and hook member carried by the movable member.

2. In a device of the character described, a hollow handle portion, an integral elongated body portion having a guard formed at one end thereof, said guard having a central opening, a movable member having a notched portion and adapted to engage one end of the handle portion to lock the movable member in its extended position, and a needle and hook member carried by the movable member.

3. In a device of the character described, a body portion, a handle formed at one end of the body portion, a guard at the other end of the body portion, a movable member supported by the body portion, said movable member having a bifurcated extremity to receive elastic bands, a pivoted hook member carried by the movable member, and said pivoted hook member adapted to engage portions of the elastic bands.

4. In a device of the character described, a body portion, a movable member supported by the body portion and having a bifurcated end to accommodate elastic bands, means for locking the movable member with respect to the body portion, and pivoted means carried by the movable member for receiving the elastic bands.

In testimony that I claim the foregoing as my own, I have hereto affixed my signature in the presence of two witnesses.

CORRY E. McNEMAR.

Witnesses:
HARRY SMETHURST,
GEO. H. REYER.